United States Patent [19]

Newcombe et al.

[11] Patent Number: 4,976,460
[45] Date of Patent: Dec. 11, 1990

[54] THERMOSTATIC VALVES

[75] Inventors: Haydn J. Newcombe; Jeffrey C. Lowe, both of Wolverhampton, England

[73] Assignee: Armitage Shanks Ltd., United Kingdom

[21] Appl. No.: 449,474

[22] Filed: Dec. 11, 1989

Related U.S. Application Data

[63] Continuation of Ser. No. 214,524, Jul. 1, 1988, abandoned.

[30] Foreign Application Priority Data

Jul. 3, 1987 [GB] United Kingdom ................ 8715717

[51] Int. Cl.$^5$ .............................................. F16K 1/00
[52] U.S. Cl. .................................. 236/12.12; 137/606; 251/332
[58] Field of Search ..................... 236/12.12; 251/332; 137/606

[56] References Cited

U.S. PATENT DOCUMENTS

| | | | |
|---|---|---|---|
| 2,508,074 | 5/1950 | Miller et al. ..................... | 236/12.12 |
| 3,036,594 | 5/1962 | Salisbury ........................ | 251/332 X |
| 3,154,141 | 10/1964 | Huet ................................. | 165/133 |
| 3,171,069 | 2/1965 | Koltuniak et al. .............. | 165/133 X |
| 3,200,839 | 8/1965 | Gallagher ....................... | 251/332 X |
| 4,310,144 | 1/1982 | Nogaki ......................... | 74/424.8 VA |
| 4,359,186 | 11/1982 | Kiendl .............................. | 236/12.12 |
| 4,420,811 | 12/1983 | Tarnay et al. ................. | 137/561 R |

Primary Examiner—William E. Wayner
Attorney, Agent, or Firm—Learman & McCulloch

[57] ABSTRACT

A thermostatic mixing valve is described having separate valves for hot and cold water each with a stepping motor to adjust their positions and connected to a microprocessor using a temperature sensor in a mixing chamber to read the mixed temperature and step the motors individually to adjust the valve positions as required.

4 Claims, 5 Drawing Sheets

THERMOSTATIC VALVES

This is a continuation of application Ser. No. 214,524 filed on July 1, 1988, now abandoned.

This invention relates to thermostatically controlled mixing valves for water supply.

The object of the invention is to provide an electronically controlled mixing valve which can be controlled by microprocessor circuitry so as to operate to preset, but adjustable, standards as to temperature and possibly also volume.

According to the invention a thermostatically controlled valve comprises a pair of stepping motors each connected to a corresponding proportioning valve for controlling the rate of flow of hot and cold water respectively, and arranged to sense the temperature of the mixed flows.

One embodiment of the present invention is now more particularly described with reference to the accompanying drawings wherein.

Figure 1:
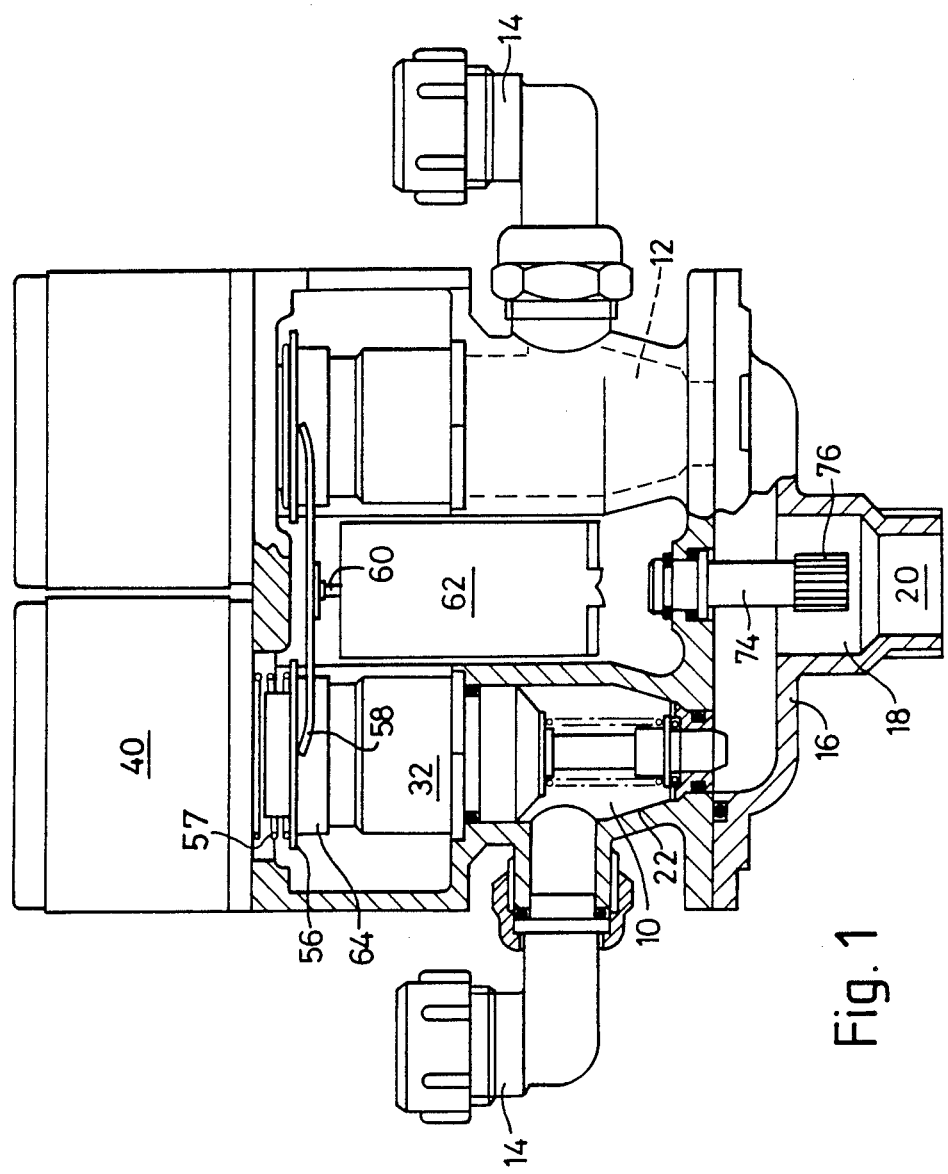
FIG. 1 is a part sectional elevation of a mixing valve.

Turning now to FIG. 1, the mixing valve shown has two separate chambers 10, 12, each connected to a corresponding inlet 14 and to a manifold 16 of which the stem forms a mixing chamber 18 opening to a mixed water outlet 20. The manifold is generally Tee shaped in elevation as seen in the drawings, and the heat of the Tee may be shaped to encourage vortex flow e.g. by each limb of the head of the Tee opening generally tangentially of the outlet 20 as seen in plan view. Each chamber houses a control valve. As the two chambers and control valves are identical, only one will be further described.

Figure 3:
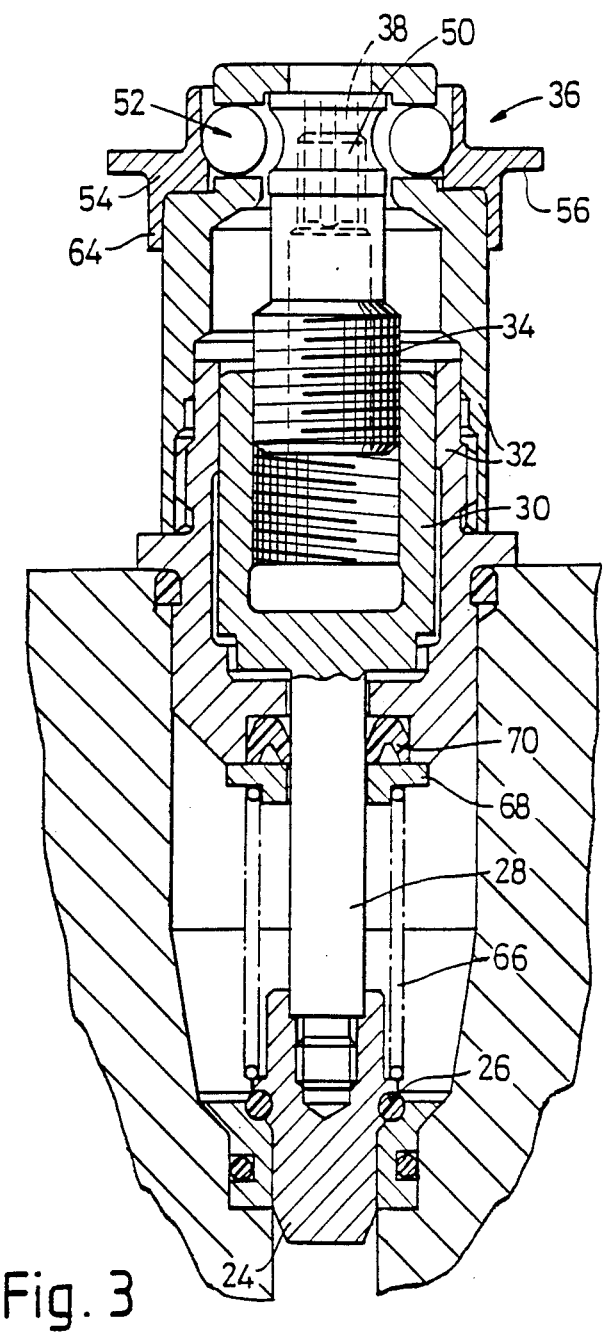
Figure 4:
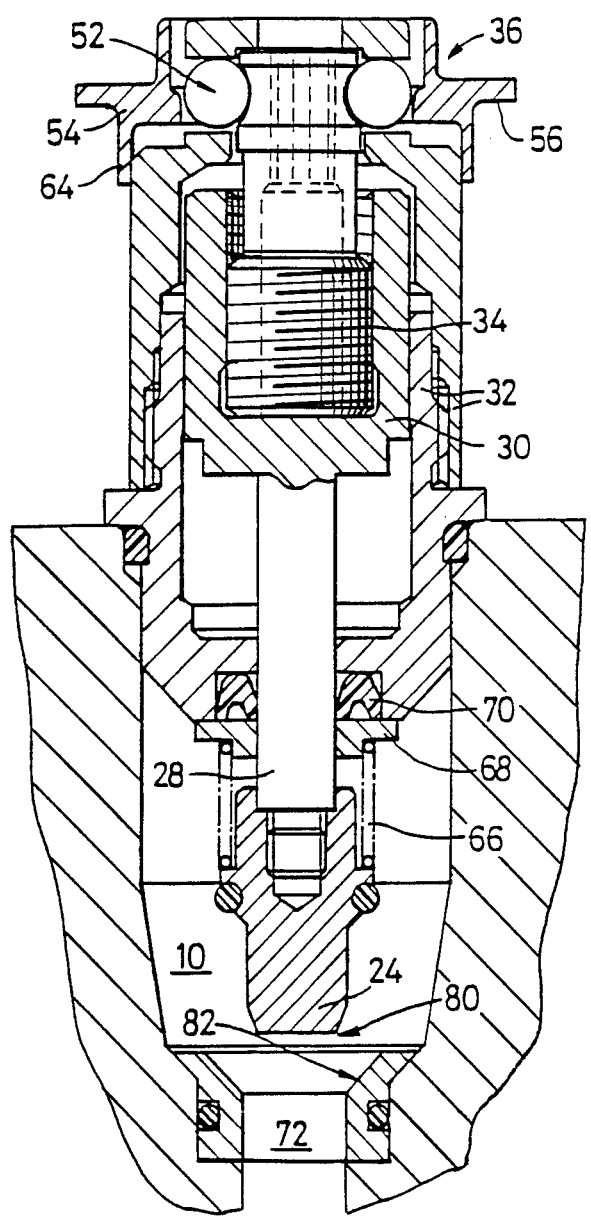

The chamber has a relatively steep angle frusto-conical passage 22, FIG. 1, narrowing towards the outlet 72, FIG. 4. Closure plug 24 (FIGS. 2-5) is to close the outlet and has an 0 ring seal 26 for this purpose. The arrangement and shape is such that the plug can be moved from the closed position to the fully open position through a range of intermediate positions which allow progressively greater flow rates. This is due to the relationship and spacing between the rim 80 at the lower end of the plug and the relatively shallow angle frusto-conical portion 82 of the chamber immediately adjacent the outlet 72. As the plug is moved away from the outlet, the cross sectional area available for flow increases progressively.

The plug is carried by a stem 28 fast with a nut 30 which is non-rotatable in a two-part housing 32, as by making the nut hexagonal and the housing of like shape in its interior. The nut 30 is engaged with a screw 34 which is held axially captive by a clutch 36. The screw has a non-circular bore 38 which is angularly fast with and in sliding engagement with the complementary drive shaft (not shown) of a stepping motor 40, FIG. 1.

The screw and nut may have any suitable screwthreads, for example multistart threads of appropriate profile, so that a rotation of the drive shaft in one or other direction causes the nut to rise or fall relative to the screw, when the screw is axially fixed.

Figure 2:
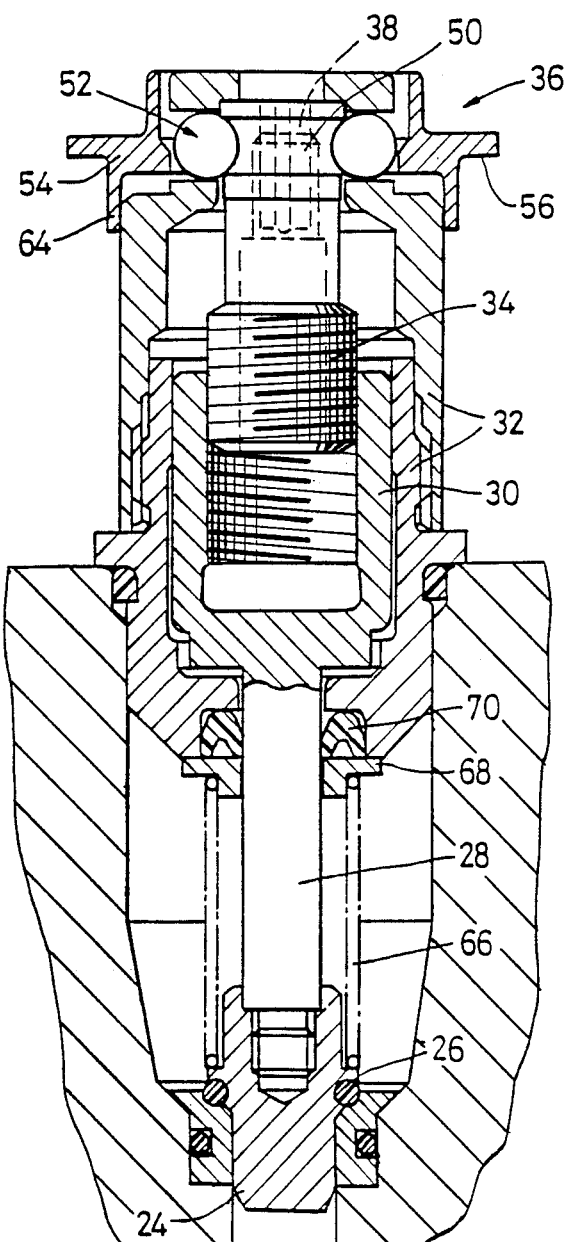
FIGS. 2-5 are larger scale sectional elevations showing a valve mechanism in different positions.

The clutch 36, which is for axially fixing the screw, comprises a hub 50 with a peripheral groove to engage clutch balls 52 which can move radially from the engaged position of FIG. 2, to the disengaged position of FIG. 3 under the control of a cam face on the interior of clutch ring 54 when the ring is moved axially between the positions seen in FIGS. 2 and 3. The ring has a radial flange 56 for actuation by fork 58, FIG. 1, carried by solenoid pin 60 arranged so that energisation of the solenoid 62 lifts the ring against the conical spring 57, to the FIG. 2 position and engages the clutch, i.e. forces the balls radially inwards to engage in the groove and lock the screw 34 in position axially whilst leaving it free to rotate.

The clutch ring 54 is guided for axial movement by collar 64 sliding on the housing 32.

The plug 24 and its stem 28 with the nut 30 are all urged by hydraulic force and by spring 66 which in this instance is a helical compression spring trapped between the plug and collar 68 which also serves to locate a seal 70.

Certain parts of the cycle of operations can now be described. Assuming that water and power are connected to the valve and the valve is in the closed normal condition a demand for water leads to the solenoid being energised to the FIG. 2 condition and to the stepping motor 40 being pulsed. Each pulse may turn the drive shaft through a small increment of the order of one or two degrees, turning the screw likewise, and moving the nut, stem and plug axially so as to open the valve. The flow rate depends upon the axial position as explained. A train of pulses can result in relatively rapid movement to the fully open position of FIG. 4, and vice versa. The valve is to be (or may be) continually adjusted, as necessary, in conjunction with similar but not necessarily like or simultaneous adjustment of the second valve so as to produce the required temperature in the mixed flow at usually the maximum possible rate. That is to say, for any required temperature setting, either one or other of the flow rates will be maximum.

If the temperature of one or other supply varies, adjustment of the valves position compensates for this. If either supply fails, the valve would ordinarily shut down as it becomes impossible to maintain the present temperature. However, a very rapid in fact almost instantaneous shut down is provided by the solenoid clutch. De-energisation either as a result of power failure or a signal from the electronic control results in pin 60 falling, taking with it fork 58 so as to allow the clutch ring 56 to follow under load from the spring 57. This moves from the FIG. 2 position to the FIG. 3 position: if the valve was open, then spring 66 displaces the screw and nut in whatever adjusted position they were in, to the FIG. 5 position. This is much more rapid than could possibly be achieved by any rotation of the drive shaft because it is accomplished by the spring driven and hydraulically assisted sliding movement of the whole screw and nut relative to the drive shaft. Such de-energisation from any cause also terminates the train of pulses to the drive motor. However, the length of the drive shaft (not shown) is such that it remains in driving engagement with the screw even in the FIG. 5 position.

Figure 5:
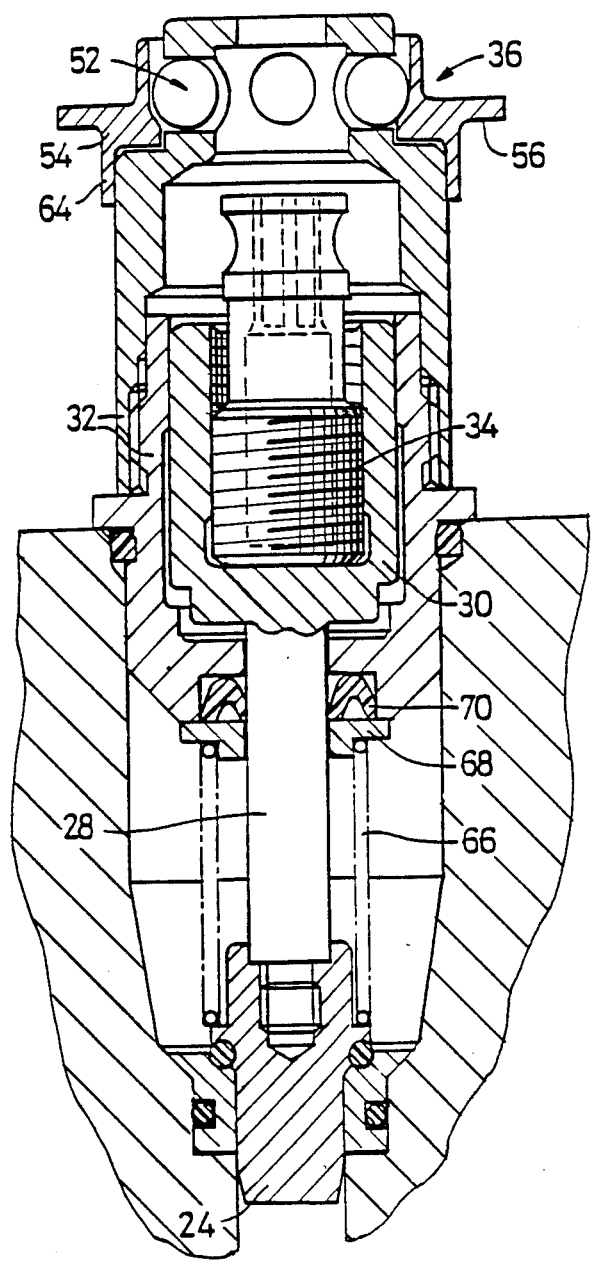

If the de-energisation is caused by a power failure, then, upon re-energisation, the circuitry causes a train of pulses to the drive motor sufficient to rotate the shaft and return the screw from the FIG. 5 position to the FIG. 3 position before the solenoid is re-energised to move the clutch to the FIG. 2 position. However, if the shut-down is not due to power failure, the screw may be returned upon the de-energisation.

The flows through the two chamber outlets 72 meet in the manifold and flow through common outlet 20. It has been found that little mixing may take place in the mixing chamber unless some turbulence is created, and for this purpose temperature sensor 74 is provided with a knurled or otherwise roughened end 76. This knurling also provides increased surface area for heat transfer.

Signals derived from the sensor 74 are used, via appropriate circuitry to cause pulses to be sent to one or other or both motors for stepping in one or other directions to cause flow rate adjustments so as to proportion the respective flows and achieve the required temperature output.

The circuitry includes a microprocessor with analogue/digital converters for reading analogue signals from the sensed temperature which may be via a silicon sensor, and possibly also from the separate temperatures of the hot and cold water supplies, and also to monitor motor current wave forms. Separate sensing is useful in enabling the valve to be inoperable if one or other or both temperatures are outside a range which can be mixed to give the required temperature in the valve. Preferably also the microprocessor has an associated and non-volative memory which can effectively be present with the required temperatures and flows for example to give a hot bath or a warm shower or the like. The microprocessor may have an associated key pad with dedicated controls so that a user may simply select a hot bath and the appropriate memory segment will be connected, temperatures read, and assuming the input temperatures are within the acceptable parameters, the mixing valve will then be adjusted to deliver water at the present temperature. In a simplest form of the invention, the keypad will be operated again when the bath has been filled to a level approved by the user, but in more sophesticated versions of the invention, the volume delivered may be read and compared with a programme memory so that the valve is automatically shut off when that volume has been delivered.

We claim:

1. A thermostatic mixing valve for hot and cold liquids comprising a valve body having separate hot and cold liquid inlets each communicating with a corresponding separate valve chamber both of which communicate with a manifold having a common outlet through which a mixture of said liquids may flow; each of said chambers including a cylindrical portion terminating at the larger end of a first frusto-conical portion of steep angle, the smaller end of said first frusto-conical portion communicating with a smaller frusto-conical portion of shallow angle, the smaller end of said smaller frust-conical portion opening to a further and still smaller cylindrical passage communicating with said manifold, said chamber portions being arranged for successive flow therethrough from said inlet to said manifold; a separate valve assembly located in each of said chambers, each said assembly comprising a cylindrical plug movable between a first position in which the outlet of the corresponding chamber is fully open and in which said plug is wholly located in said first frusto-conical portion, and a fully closed position in which said plug is wholly located in said further smaller cylindrical passage, and through a series of intermediate partly opened positions offering progressively greater clearance between said plug and the chamber wall so as to allow for fine control over flow rate through said chamber and to said manifold, a stem mounting said plug fast with a threaded nut, said nut being angularly fast in said assemsbly but free for axial movement therein to move the plug to any selected position between said fully open position via said intermediate positions to the fully closed position, said assembly further including a screw threadedly engaged with said nut, said screw being axially fixed but free for rotation in said assembly; a temperature sensor for sensing the temperature of the mixture of liquids; a separate stepping motor connected to each of said screws; and means responsive to a change in the temperature of said mixture of liquids to actuate one or other of said motors and adjust the position of the associated plug in a direction to control said flow rate so as to maintain the temperature of said mixture of liquids substantially constant.

2. A valve according to claim 1 wherein said manifold is tee shaped and said temperature sensor is accommodated in said manifold.

3. A valve according to claim 1 wherein said sensor is mounted in said manifold and is so configured as to create turbulence in the flow of liquids through said mixing chamber.

4. A valve according to claim 1 wherein sealing means in the form of an O-ring is mounted on each of said plugs for sealing engagement with said frusto-conical portions of shallower angle.

* * * * *

UNITED STATES PATENT AND TRADEMARK OFFICE
CERTIFICATE OF CORRECTION

PATENT NO.   : 4,976,460
DATED        : December 11, 1990
INVENTOR(S)  : Haydn J. Newcombe It is certified that error appears in the above-identified patent and that said Letters Patent is hereby corrected as shown below:

Column 1, line 56 change "capative" to -- captive --.

Column 2, line 16 after "and" insert -- a --; line 40 change "present" to -- preset --.

Column 3, lines 23 and 31 change "present" to -- preset --.

Column 4, line 3 change "shallow" to -- shallower --.

Signed and Sealed this

Twenty-eighth Day of April, 1992

Attest:

HARRY F. MANBECK, JR.

Attesting Officer    Commissioner of Patents and Trademarks